United States Patent
Elliott

(10) Patent No.: US 7,139,262 B1
(45) Date of Patent: Nov. 21, 2006

(54) SYSTEMS AND METHODS FOR CREATING WIRELESS SMALL WORLD NETWORKS

(75) Inventor: Brig Barnum Elliott, Arlington, MA (US)

(73) Assignee: BBN Technologies Corp., Cambridge, MA (US)

(\*) Notice: Subject to any disclaimer, the term of this patent is extended or adjusted under 35 U.S.C. 154(b) by 0 days.

(21) Appl. No.: 09/573,860

(22) Filed: May 18, 2000

(51) Int. Cl.
*H04L 12/28* (2006.01)
*H04L 12/50* (2006.01)
*H04L 12/66* (2006.01)

(52) U.S. Cl. ................................................. 370/351

(58) Field of Classification Search ........ 370/338–346, 370/300, 351, 401, 436, 449, 349, 252, 254, 370/238, 331, 342, 458, 352–353, 335, 509, 370/316, 390, 394, 255; 455/450–456, 524, 455/427, 500, 422.1, 518, 431, 515, 552.1, 455/512, 456.1, 422; 375/350–356; 342/457, 342/450; 709/238, 241
See application file for complete search history.

(56) References Cited

U.S. PATENT DOCUMENTS

| | | | | |
|---|---|---|---|---|
| 5,715,516 A | * | 2/1998 | Howard et al. | 455/422.1 |
| 5,987,011 A | * | 11/1999 | Toh | 370/331 |
| 6,104,712 A | | 8/2000 | Robert et al. | |
| 6,130,881 A | * | 10/2000 | Stiller et al. | 370/238 |
| 6,236,365 B1 | * | 5/2001 | LeBlanc et al. | 342/457 |
| 6,282,427 B1 | * | 8/2001 | Larsson et al. | 455/456.2 |
| 6,292,671 B1 | * | 9/2001 | Mansour | 455/518 |
| 6,304,556 B1 | * | 10/2001 | Haas | 370/254 |
| 6,449,484 B1 | * | 9/2002 | Grubeck et al. | 455/450 |
| 6,456,599 B1 | * | 9/2002 | Elliott | 370/254 |
| 6,480,558 B1 | * | 11/2002 | Ottosson et al. | 375/350 |
| 6,526,035 B1 | * | 2/2003 | Atarius et al. | 370/342 |
| 6,553,020 B1 | * | 4/2003 | Hughes et al. | 370/347 |

OTHER PUBLICATIONS

Perz, H. et al, Adjustable transmission power for mobile communications with omnidirectional and directional antennas in a one and multi-hop environment, May 1991, 41st IEEE Vehicular Technology Conference, p. 630-635.*

Håkan Mitts, Harri Hansén; A Simple and efficient Routing Protocol for the UMTS access Network; Oct. 1996 Mobile Networks and Applications, vol. 1 Issue 2; pp. 167-181.*

K. Y. Eng, M. J. et al, A wireless broadband ad-hoc ATM local area network; Feb. 1995, Wireless Networks, vol. 1 Issue 2, pp. 161-174.*

M.E.J. Newman, "Renormalization Group Analysis of the Small-World Network Model," Phys. Lett. A 236, 1999, pp.341-346 (provided as pp. 1-14).

L. Adamic, "The Small World Web," Xerox Palo Alto Research Center, http://www.parc.xerox.com/istl/groups/iea/www/SmallWorld.html, Apr. 13, 2000, pp. 1-9.

B. Steele, "Explaining the 'Small World' Phenomenon," CMSE Online, Jun. 12, 1998, pp. 1-3.

\* cited by examiner

*Primary Examiner*—Wellington Chin
*Assistant Examiner*—Prenell Jones
(74) *Attorney, Agent, or Firm*—Fish & Neave IP Group Ropes Gray LLP

(57) ABSTRACT

A system (510) routes packets in a network (200) having multiple nodes. The system identifies a group (500) of the nodes (520–550) and determines routing distances to each of them. The system (510) then selects a set of the nodes from the group (500) based on the determined routing distances and updates a routing table based on the selection. The system (510) routes packets through the network (200) using the updated routing table.

40 Claims, 14 Drawing Sheets

SYSTEMS AND METHODS FOR CREATING WIRELESS SMALL WORLD NETWORKS

BACKGROUND OF THE INVENTION

A. Field of the Invention

The present invention relates generally to communication systems and, more particularly, to small world wireless ad hoc networks.

B. Description of Related Art

The use of ad hoc wireless networks has increased in recent years. An ad hoc wireless network typically includes several wireless, usually mobile, nodes. Each of the nodes includes an omni-directional antenna and communicates with only the nodes that are a single radio hop away. In such a network, each node acts as a router, forwarding packets of data from one node to another.

As the size of ad hoc wireless networks increase (i.e., to include hundreds or thousands of nodes), the problem of increased end-to-end transmission delays through the network results. Competing factors tend to make finding a solution to this problem difficult. These factors include the desire to transmit packets through the network at lower power and the desire to transmit packets through the network as quickly as possible.

Turning down the power on network transmissions maximizes spatial reuse of the radio frequency (RF) spectrum through the network. This low power transmission approach, however, gives rise to a network in which a given packet of data must take many hops from one node to another in order to cross the entire network, leading to a high end-to-end delay. On the other hand, direct, high power transmissions across the entire network are generally counter-productive because they result in a large area of radio interference and, hence, lower overall network throughput by eliminating spatial reuse of the RF spectrum.

FIGS. 1A and 1B are network diagrams that illustrate the single, high power transmission approach and the multi-hop, low power transmission approach, respectively. In FIG. 1A, a source node A turns up the power on its transmitter and transmits directly across the network to destination node B in a single hop. This high-power transmission causes interference over a wide area and leads to a corresponding reduction in overall network throughput because other nodes in the interference zone must keep silent during the transmission. As shown in FIG. 1A, the interference zone includes twenty-five blocked nodes. On the other hand, the single, high power transmission approach delivers the packet to its destination in just one radio transmission.

In FIG. 1B, the source node A uses a low power, multi-hop transmission. This series of small, hop-by-hop transmissions at low power results in better overall system capacity because it permits better spatial reuse of the RF spectrum. This multi-hop approach decreases the size of the interference zone over the single transmission approach. As shown in FIG. 1B, the interference zone includes twelve blocked nodes. On the other hand, the multi-hop approach requires a larger number of transmissions over the single transmission approach. Because the process of channel access takes time, as does the process of actually transmitting the data in the packet, an n-hop approach takes roughly n times as long as a 1-hop approach to deliver a packet from the source to the destination.

As a result, a need exists for a system that takes advantage of the benefits of the competing approaches while minimizing their disadvantages.

SUMMARY OF THE INVENTION

Systems and methods consistent with the present invention address this need by providing a small world network that introduces a small number of nodes that create "giant steps" across the network.

In accordance with the purpose of the invention as embodied and broadly described herein, a system routes packets in a network having multiple nodes. The system identifies a group of the nodes and determines routing distances to each of them. The system then selects a set of the nodes from the group based on the determined routing distances and updates a routing table based on the selection. The system routes packets through the network using the updated routing table.

In another implementation consistent with the present invention, a first node is located in a network having multiple second nodes. At least some of the second nodes include an omni-directional antenna. The first node includes a directional antenna, a memory, and a processor. The directional antenna permits the first node to communicate with a group of the second nodes. The memory stores a routing table used for transmitting packets through the network. The processor identifies the group of second nodes, selects a set of the second nodes from the group, updates the routing table based on the selected set of second nodes, and routes packets through the network using the updated routing table.

In yet another implementation consistent with the present invention, a method for selecting neighboring nodes by a node in a network having multiple nodes includes detecting nodes within a communication area; determining a routing distance to each of the detected nodes; selecting one of the detected nodes with a largest routing distance; and identifying the selected node as a neighboring node.

In a further implementation consistent with the present invention, a system selects a direction for a steerable directional antenna of a wireless node in a network including multiple nodes. The system includes a memory and a processor. The memory stores instructions. The processor executes the instructions in the memory to point the steerable directional antenna in multiple directions, identify the nodes present in each of the directions, determine a routing distance to each of the identified nodes, select one of the identified nodes with a largest routing distance, and point the steerable directional antenna in the direction of the selected node.

In another implementation consistent with the present invention, a small world network includes multiple first nodes and at least one second node. Each of the first nodes includes an omni-directional antenna. The second node(s) includes a directional antenna, a memory, and a processor. The directional antenna permits the second node to communicate with a group of the first nodes. The memory stores a routing table used for transmitting packets through the network. The processor identifies the group of first nodes, determines a routing distance to each of the first nodes in the group, selects at least one of the first nodes based on the routing distance, updates the routing table based on the selected first node(s), and routes packets through the network using the updated routing table.

In yet another implementation consistent with the present invention, a method, for forming a small world network, includes deploying multiple nodes. Each of the nodes includes a routing table. At least a first one of the nodes includes a directional antenna. The method further includes identifying neighboring nodes by each of the nodes in the network. To perform the identification, the first node detects nodes within a communication area, determines a routing distance to each of the detected nodes, selects at least one of the detected nodes based on the routing distance, and identifies the selected nodes as neighboring nodes. The method further includes changing the routing tables based on the identified neighboring nodes.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Systems and methods consistent with the present invention provide a small world network that has a number of nodes that include directional antennas in addition to, or instead of, the conventional omni-directional antennas used in wireless ad hoc networks. These directional antennas permit directed, long distance RF links to create "giant steps" across the network. Taken as a whole, the introduction of even a small number of nodes with directional antennas in a wireless ad hoc network may drastically reduce the network diameter. The network diameter may be defined as the maximum number of hops that a packet must take to cross the network from its source to its destination node.

Exemplary Network

Figure 1A:
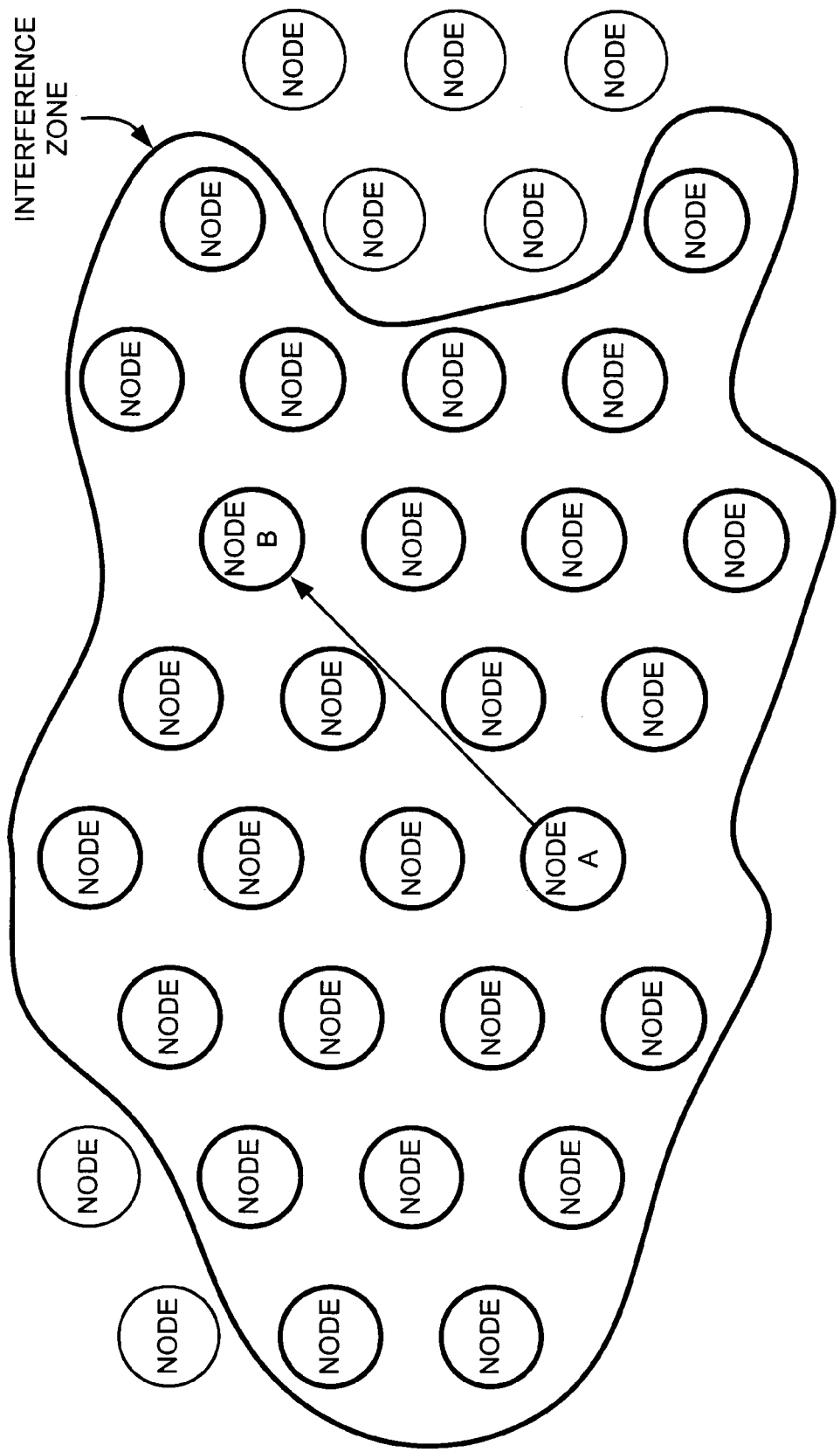
FIGS. 1A and 1B are network diagrams that illustrate conventional single, high power transmission and multi-hop, low power transmission approaches, respectively.
Figure 1B:
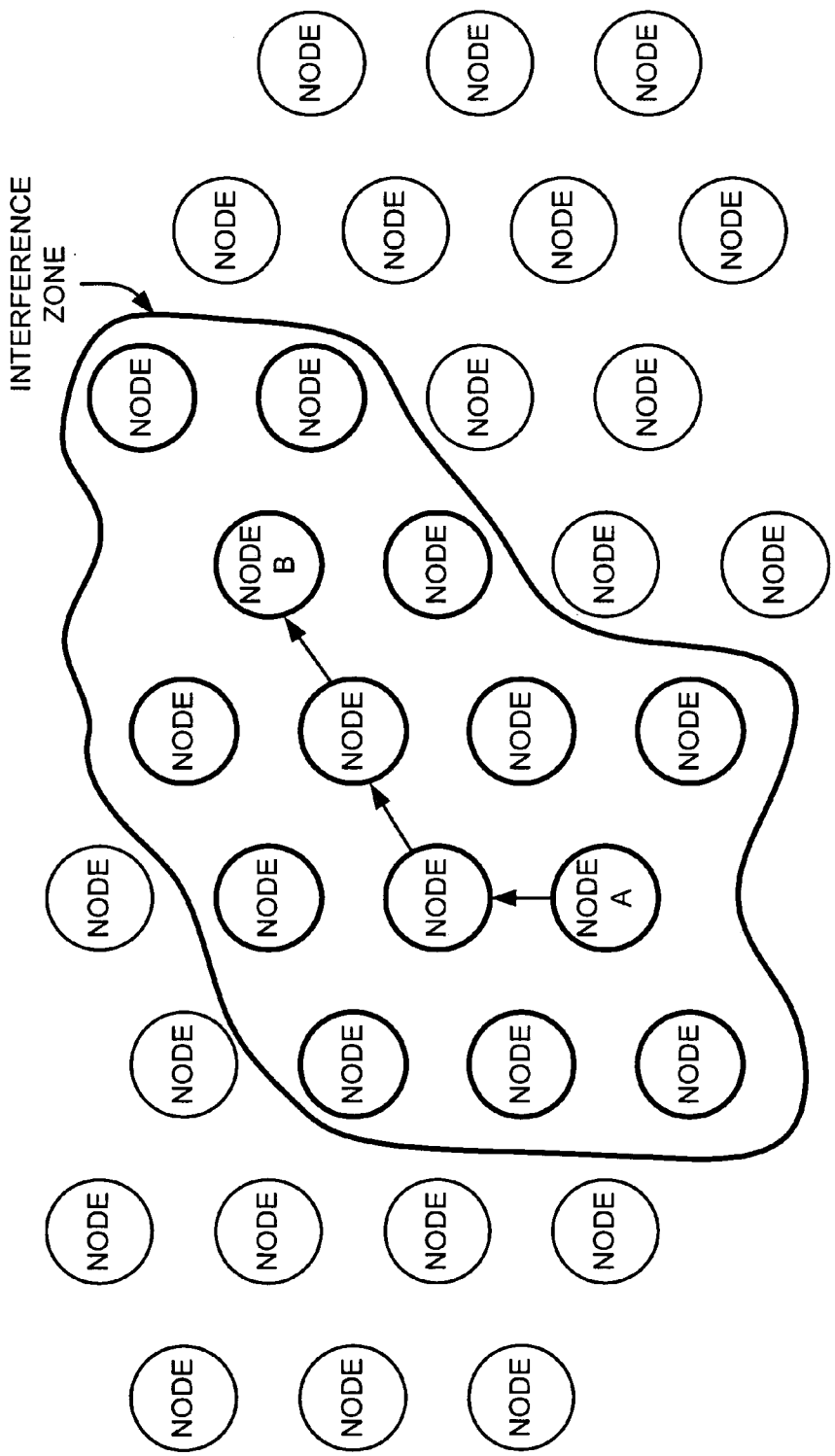
Figure 2:
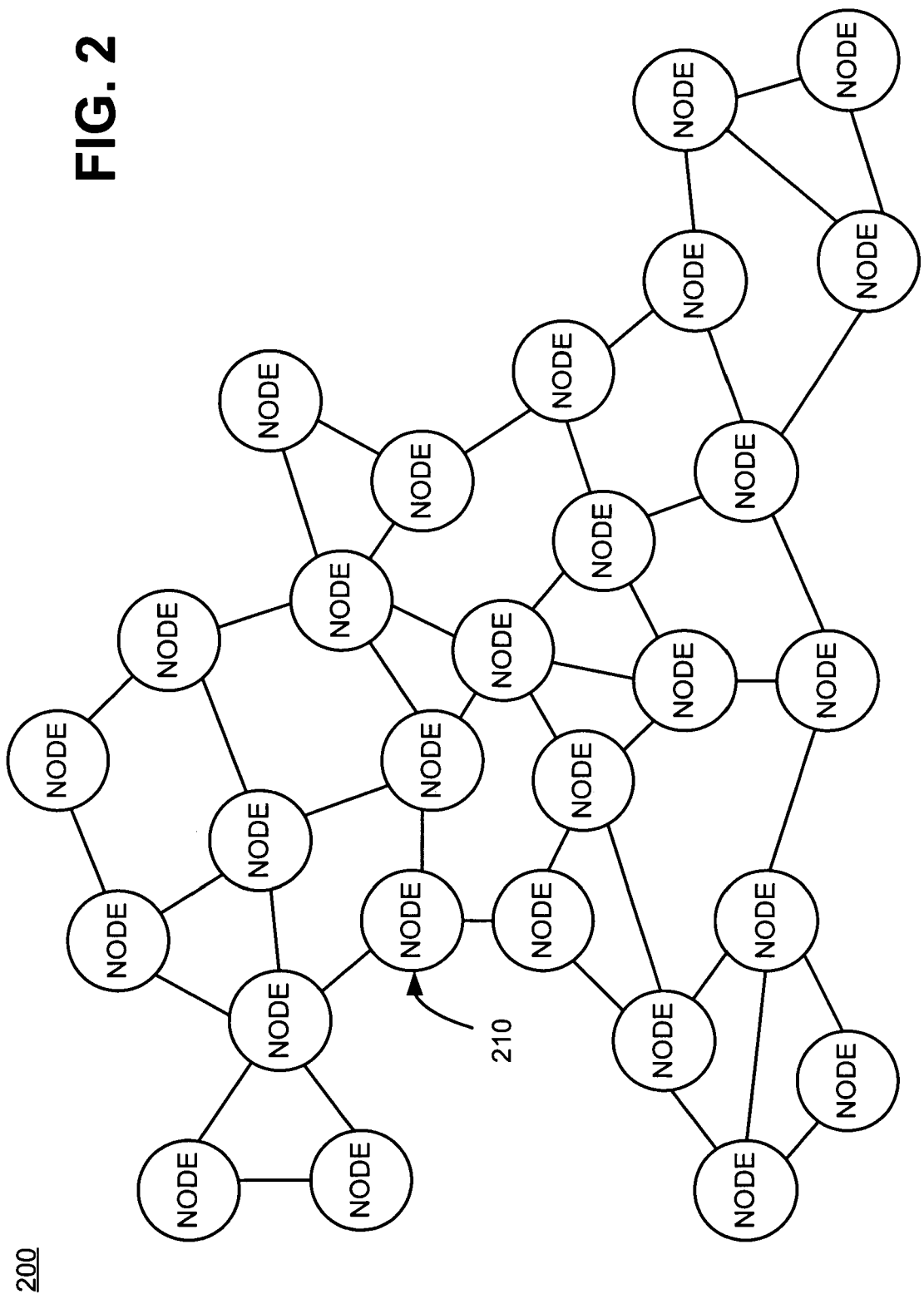
FIG. 2 is an exemplary diagram of a network in which systems and methods consistent with the present invention may be implemented.

FIG. 2 is a diagram of an exemplary network 200 in which systems and methods consistent with the present invention may be implemented. The network 200 may include several interconnected nodes. Each of the nodes may include an omni-directional antenna to connect to its neighbor nodes via RF communication paths or links. A node may be mobile and may include a router or another type of mechanism capable of receiving data packets and forwarding them to their destination. In an implementation consistent with the present invention, at least a small number of these nodes (e.g., node 210) includes a directional antenna in addition to, or instead of, an omni-directional antenna.

A. Exemplary Nodes

Figure 3:
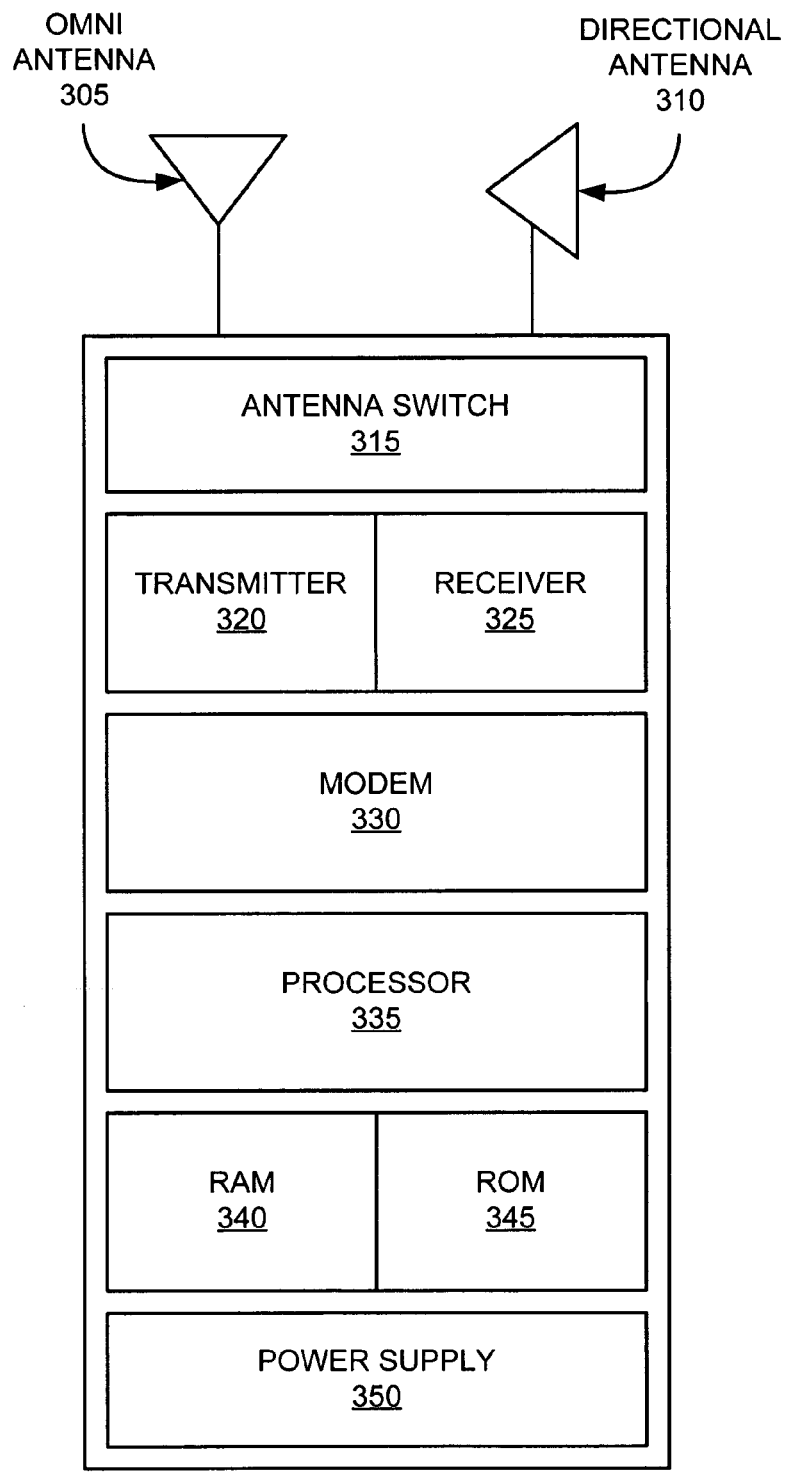
FIG. 3 is an exemplary diagram of a node according to one implementation consistent with the present invention.

FIG. 3 is a diagram of a node 210 according to one implementation consistent with the present invention. The node 210 may include an omni-directional antenna 305, a directional antenna 310, an antenna switch 315, a transmitter 320, a receiver 325, a modem 330, a processor 335, a random access memory (RAM) 340, a read only memory (ROM) 345, and a power supply 350. These components may be connected via one or more buses (not shown). One skilled in the art would recognize that the node 210 may be configured in any number of ways and may include other elements.

Figure 4A:
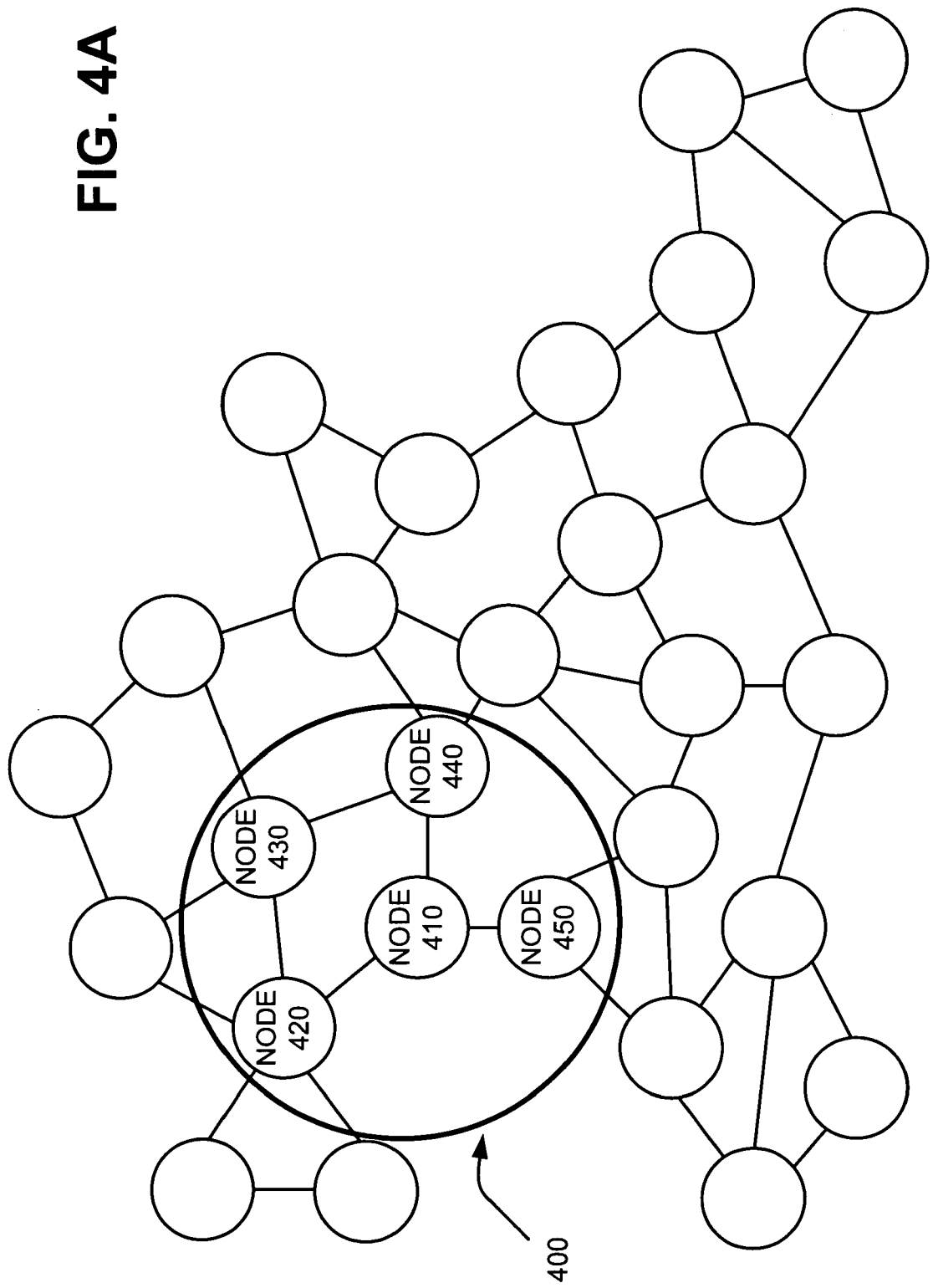
FIG. 4A is a diagram of a neighborhood for a node having an omni-directional antenna in the network of FIG. 2.
Figure 4B:
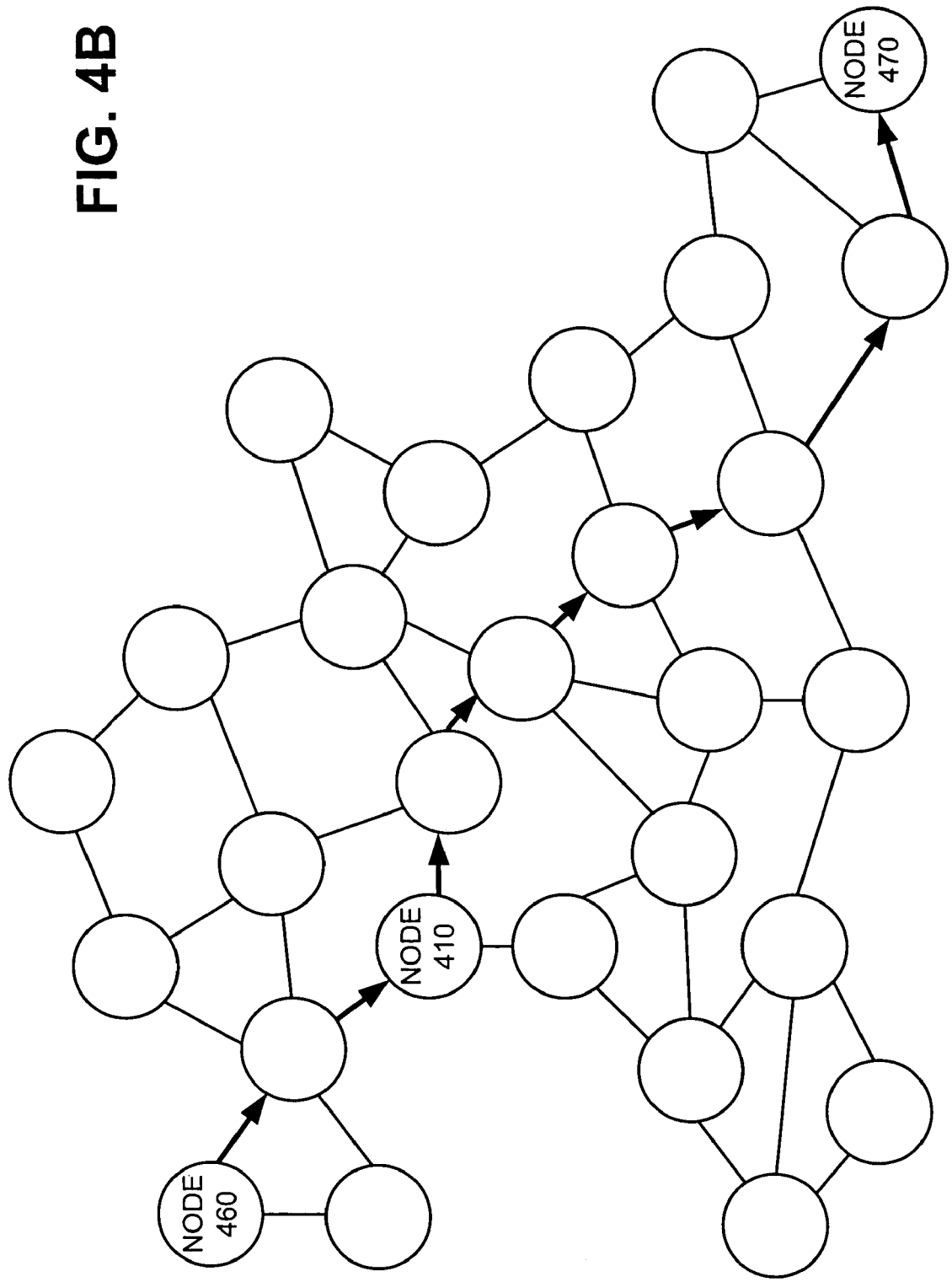
FIG. 4B is an exemplary diagram of a network transmission using an omni-direction antenna.

The omni-directional antenna 305 may include a conventional antenna capable of transmitting in several directions at once. FIG. 4A is a diagram of a neighborhood 400 for a node 410 having an omni-directional antenna in the network 200. The neighborhood 400 includes nodes 420–450 with which the node 410 can communicate. FIG. 4B is a diagram of an exemplary network transmission using an omni-direction antenna. To transmit a packet from a source node 460 to a destination node 470 in the network 200, eight hops (or separate transmissions) are required.

Figure 5A:
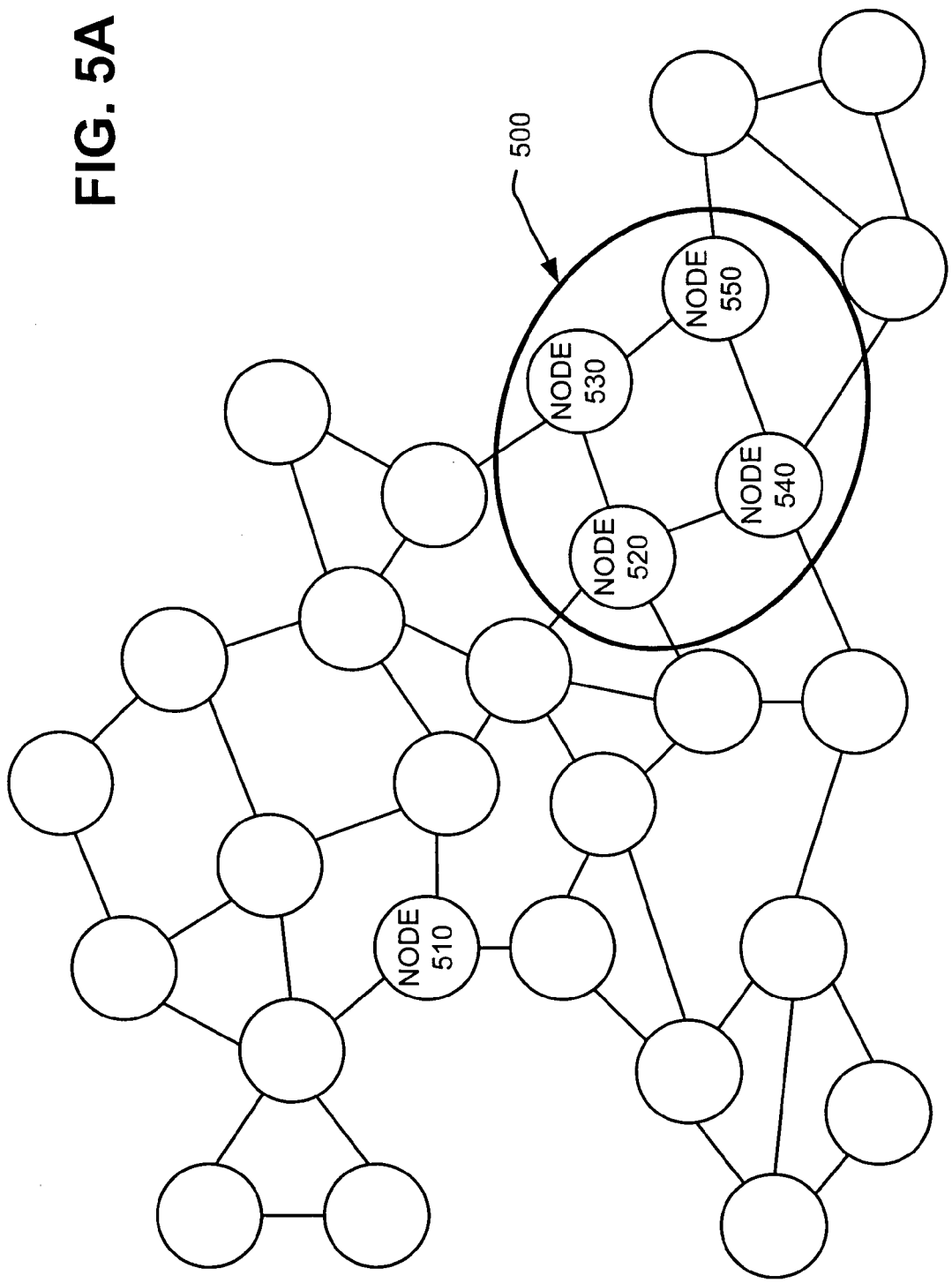
FIG. 5A is a diagram of a neighborhood for a node having a directional antenna in the network of FIG. 2.
Figure 5B:
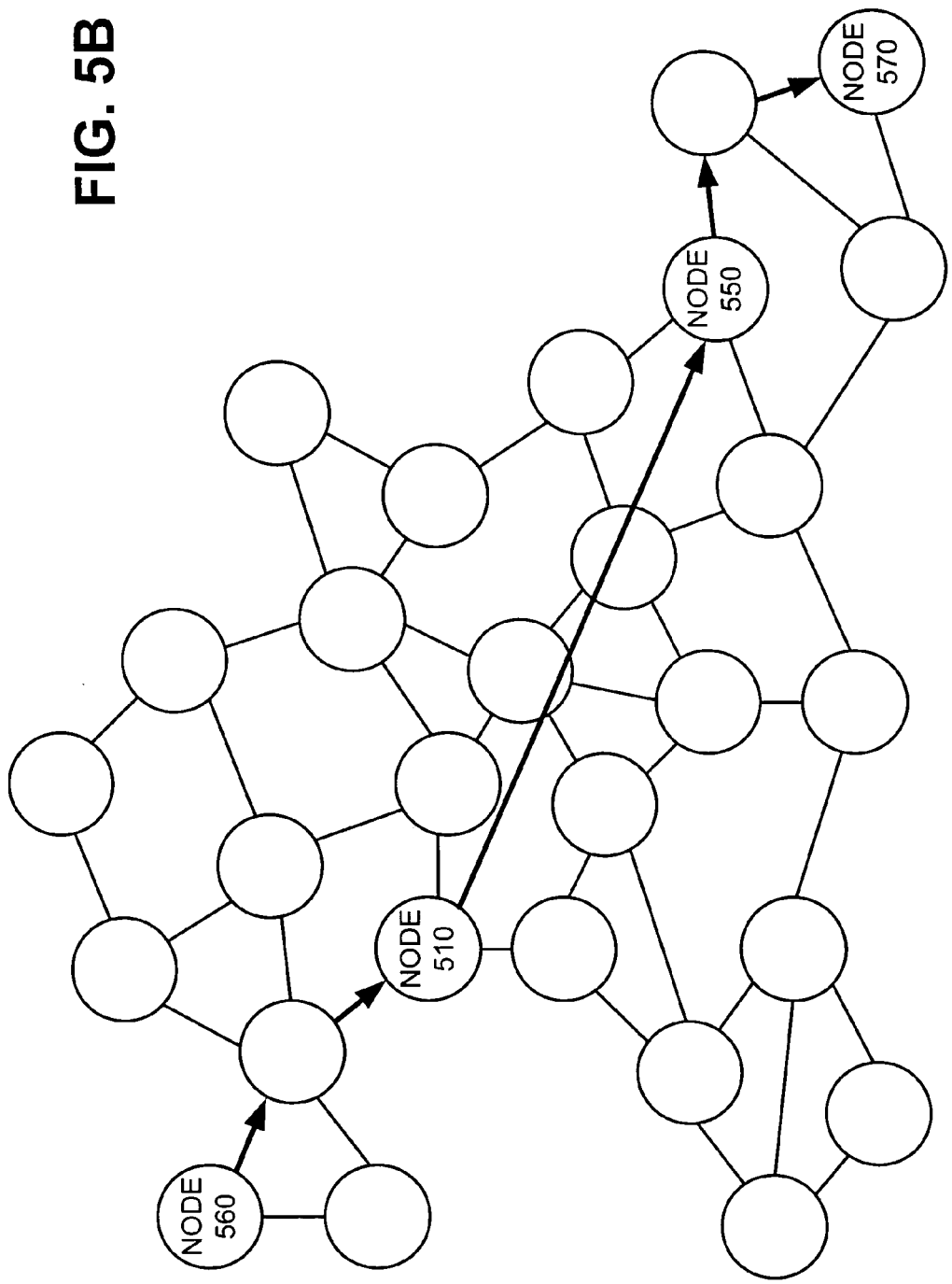
FIG. 5B is an exemplary diagram of a network transmission using a directional antenna.

Returning to FIG. 3, the directional antenna 310 may include a conventional antenna capable of transmitting in a single direction. In at least one implementation consistent with the present invention, the directional antenna 310 includes a mechanical and/or electronic mechanism for steering the directional antenna in different directions. FIG. 5A is a diagram of a neighborhood 500 for a node 510 having a directional antenna in the network 200. The neighborhood 500 includes nodes 520–550 with which the node 510 can communicate. FIG. 5B is a diagram of an exemplary network transmission using a directional antenna. To transmit a packet from a source node 560 to a destination node 570 in the network 200, five hops (or separate transmissions) are required.

Returning to FIG. 3, the antenna switch 315 may include a conventional mechanism for switching between the omni-directional antenna 305 and the directional antenna 310 for transmission or reception of packets by the node 210. The transmitter 320 and receiver 325 may include conventional components for transmitting and receiving packets, respectively. Instead of being implemented as separate components, the transmitter 320 and receiver 325 may take the form of a transceiver. The modem 330 may include a conventional modulator-demodulator that converts analog signals to digital signals, and vice versa, for communication to or from the node 210.

The processor 335 may include any type of conventional processor or microprocessor that interprets and executes instructions. The processor 335 may also employ encryption techniques for transmissions to or from the node 210. The RAM 340 may include a conventional RAM device or another type of dynamic storage device that stores information and instructions for execution by the processor 335. The ROM 345 may include a conventional ROM device or another type of static storage device that stores static information and instructions for use by the processor 335. Instructions used by the processor 335 may also, or alternatively, be stored in another type of computer-readable medium. A computer-readable medium includes one or more memory devices and/or carrier waves.

The power supply 350 may include a battery, or the like, for providing power to the components of the node 210. In some implementations consistent with the present invention, the power supply 350 includes a recharging mechanism to permit the battery to be recharged, using, for example, solar power techniques.

Figure 6:
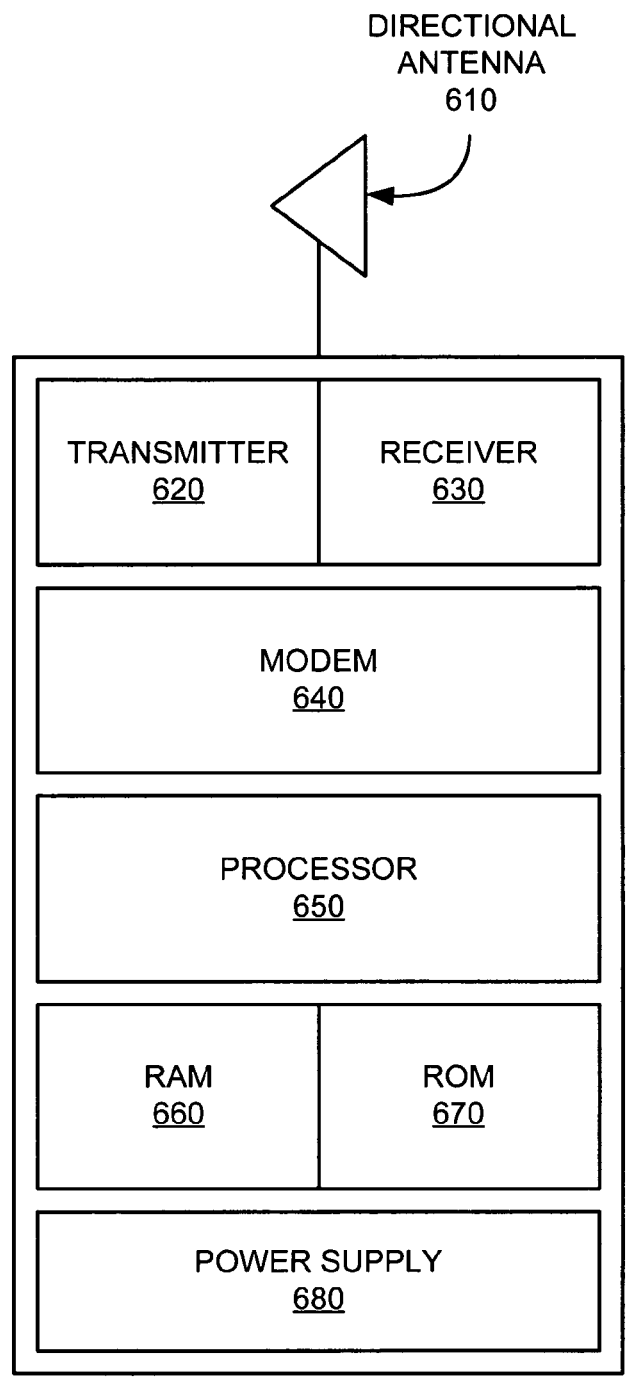
FIG. 6 is an exemplary diagram of a node according to another implementation consistent with the present invention.

FIG. 6 is a diagram of a node 210 according to another implementation consistent with the present invention. The node 210 may include a directional antenna 610, a transmitter 620, a receiver 630, a modem 640, a processor 650, a RAM 660, a ROM 670, and a power supply 680. These components may be connected via one or more buses (not shown). One skilled in the art would recognize that the node 210 may be configured in other ways and may include other elements.

The directional antenna 610 may include a conventional antenna capable of transmitting in a single direction. In at least one implementation consistent with the present invention, the directional antenna 610 includes a mechanical and/or electronic mechanism for steering the directional antenna in different directions. The transmitter 620 and receiver 630 may include conventional components for transmitting and receiving packets, respectively. Instead of being implemented as separate components, the transmitter 620 and receiver 630 may take the form of a transceiver. The modem 640 may include a conventional modulator-demodulator that converts analog signals to digital signals, and vice versa, for communication to or from the node 210.

The processor 650 may include any type of conventional processor or microprocessor that interprets and executes instructions. The processor 650 may also employ encryption techniques on transmissions to or from the node 210. The RAM 660 may include a conventional RAM device or another type of dynamic storage device that stores information and instructions for execution by the processor 650. The ROM 670 may include a conventional ROM device or another type of static storage device that stores static information and instructions for use by the processor 650. Instructions used by the processor 650 may also, or alternatively, be stored in another type of computer-readable medium. A computer-readable medium includes one or more memory devices and/or carrier waves.

The power supply 680 may include a battery, or the like, for providing power to the components of the node 210. In some implementations consistent with the present invention, the power supply 680 includes a recharging mechanism to permit the battery to be recharged, using, for example, solar power techniques.

B. Exemplary Routing Database

Figure 7:
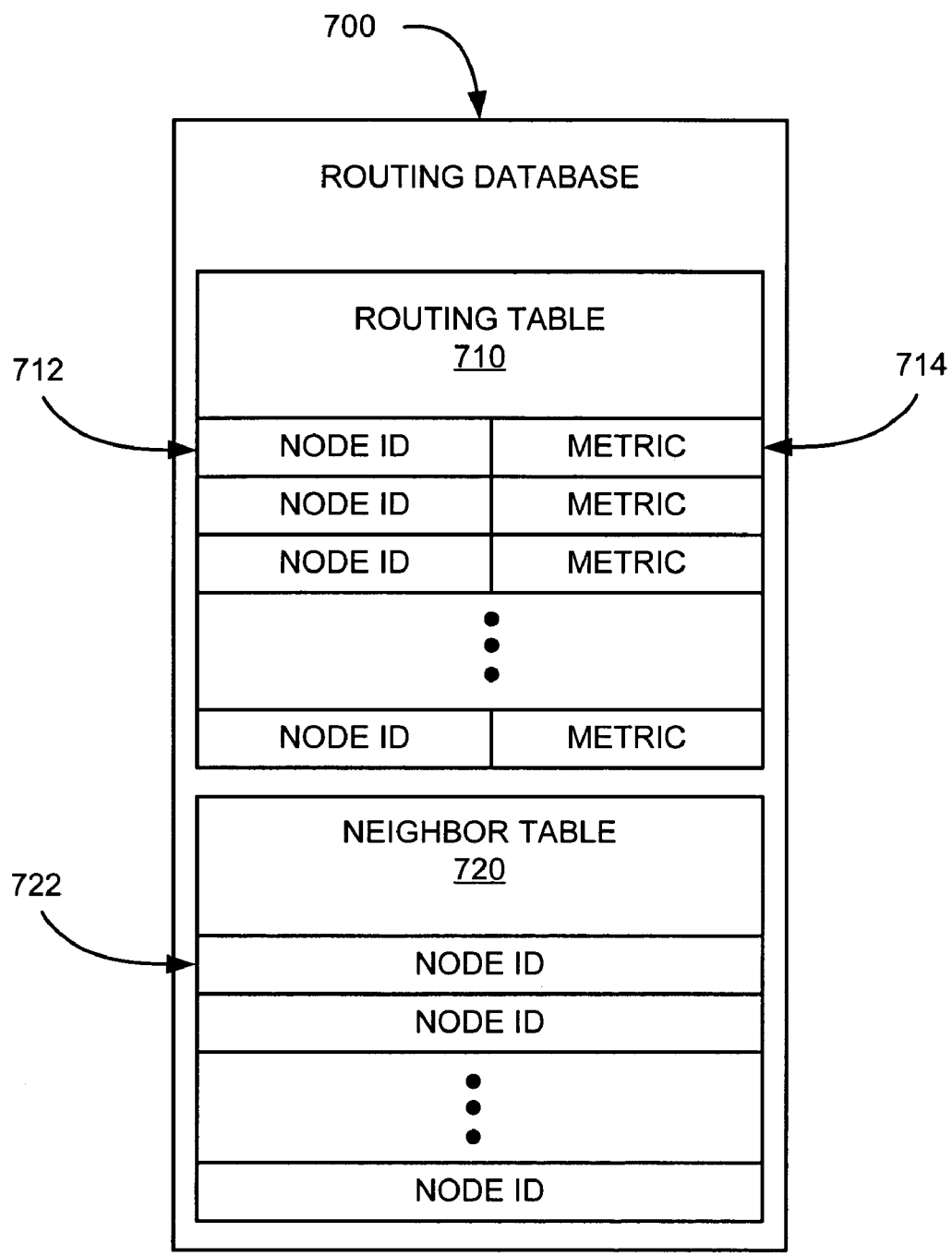
FIG. 7 is an exemplary diagram of a routing database used by the nodes of FIGS. 3 and 6.

FIG. 7 is an exemplary diagram of a routing database 700 used by the node 210. The routing database 700 may be stored in the RAM 340/660 of the node 210. The routing database 700 may include a routing table 710 and a neighbor table 720. The routing table 710 stores information on the topology of the network 200. For example, an entry in the routing table 710 may include a node identifier (ID) field 712 and a metric field 714. The node ID field 712 may store an identifier, such as a network address, of another node in the network 200. The metric field 714 may store the distance, possibly in terms of the number of hops, to the node identified by the node ID field 712.

The neighbor table 720 stores information on nodes included in the network neighborhood of the node 210. As described above, the neighborhood is defined as the set of nodes with which the node 210 can directly communicate. An entry in the neighbor table 720 may include a node ID field 722. The node ID field 722 may store an identifier, such as a network address, of a node in the network neighborhood.

Exemplary Processing

Figure 8:
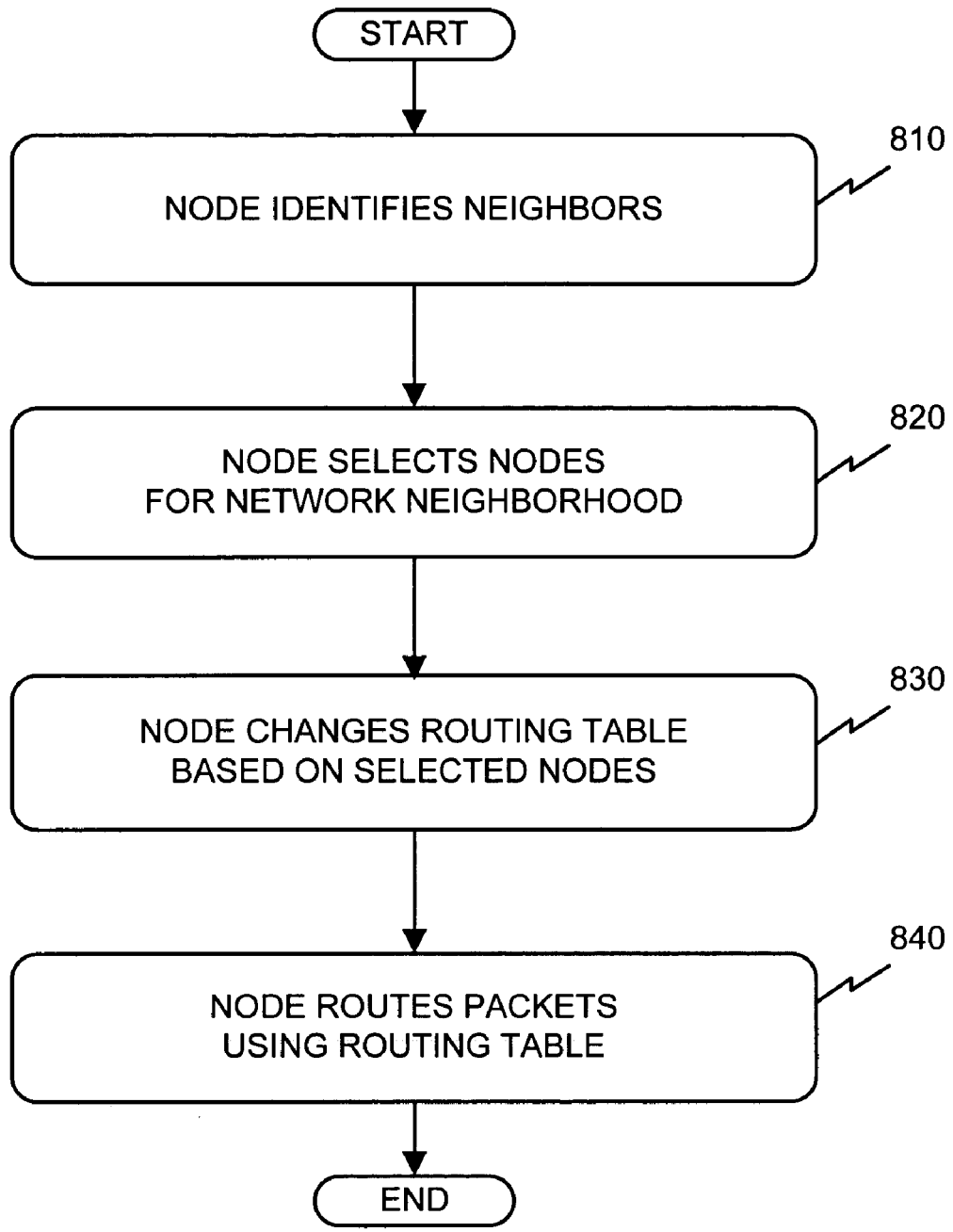
FIG. 8 is a flowchart of processing by a node in the network of FIG. 2 in an implementation consistent with the present invention.

FIG. 8 is a flowchart of processing by a node 210 in the network 200 in an implementation consistent with the present invention. At some point before processing begins, the network 200 is formed. In one example, assume that hundreds or thousands of nodes are deployed in some territory. The nodes may be deployed relatively carefully, such as by hand, and/or by a wide variety of fairly uncontrolled techniques, such as dropped in large batches from planes or helicopters, from an artillery shell, etc. In the end, the ground may be littered with these nodes with each of them lying at random angles and attitudes.

Automatic networking protocols within each of the nodes then begins to build the network 200 based on whatever RF connectivity is available between the nodes. It is important for the nodes to use as little power as possible for transmissions because the nodes are battery powered. Thus, the nodes generally use the lowest possible power for their transmissions.

Processing begins with the node 210 identifying its neighbors [step 810]. The node 210 may use "hello" packets or beacons to identify nodes with which the node 210 can communicate. A hello packet includes a node identifier that identifies the node that transmitted the packet.

Figure 9:
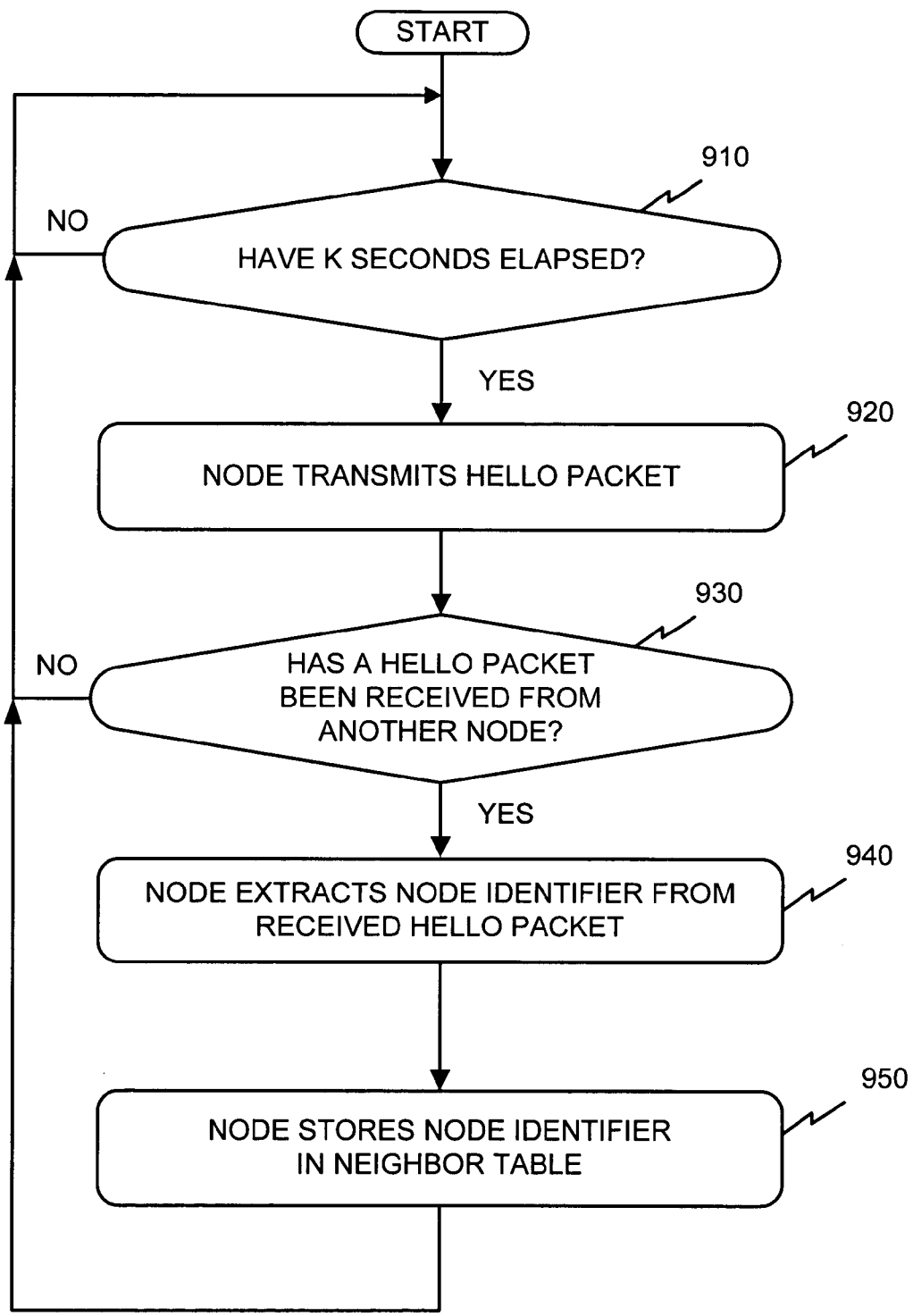
FIG. 9 is an exemplary flowchart of processing, consistent with the present invention, for identifying neighboring nodes.

FIG. 9 is an exemplary flowchart of processing for identifying neighboring nodes. The node 210 waits for a predetermined time (e.g., k seconds) to elapse [step 910] and transmits a hello packet to all nodes within a single hop [step 920]. The hello packet from node 210 informs other nodes in the network 200 that they can communicate with node 210. When these nodes receive the hello packet from node 210, they reply with their own hello packets.

The node 210 determines whether it received a hello packet from any other node [step 930]. From the received hello packets, the node 210 can determine which nodes are in its network neighborhood. For each hello packet that the node 210 receives, the node 210 extracts the node identifier from the packet [step 940] and stores the node identifier in its neighbor table 720 [step 950]. The node 210 then waits for another predetermined time to elapse [step 910] and repeats the above processing.

Figure 10:
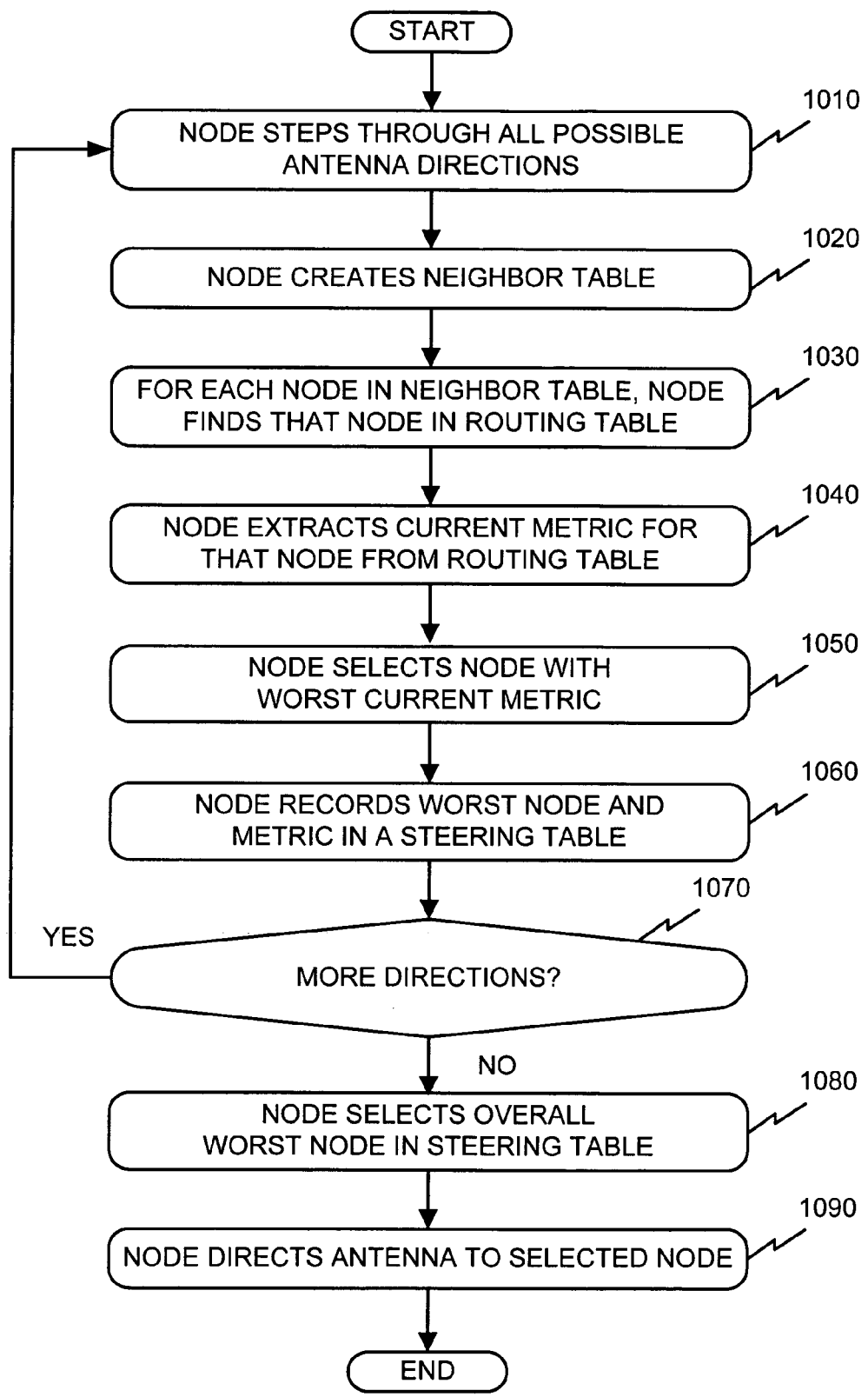
FIG. 10 is a flowchart of processing, consistent with the present invention, for selecting a steering direction for a steerable antenna.

If the node 210 uses a steerable directional antenna, the node 210 also determines which direction to steer the antenna when identifying the nodes in its network neighborhood. FIG. 10 is a flowchart of processing, consistent with the present invention, for selecting a steering direction for a steerable antenna. The node 210 first sets the steering direction to some angle beyond which the antenna cannot be steered [step 1010]. The node 210 then performs a sweep across all angles to which the antenna can be steered. If there is one degree of freedom, the node 210 simply performs a linear sweep. If there are two degrees of freedom, the node 210 chooses a scanning pattern (e.g., raster scanning, spiral scanning, etc.).

Each time the node 210 positions the antenna, the node 210 transmits and receives hello packets to identify nodes that are available in that direction. The node 210 constructs its neighbor table 720 from the node identifiers included in the hello packets received from nodes located in each of the different directions [step 1020]. For each node listed in the neighbor table 720, the node 210 finds that node in its routing table 710 [step 1030] and extracts the current metric (i.e., number of hops away) for the node [step 1040].

The node 210 then identifies the node with the largest metric (i.e., the node that is the largest number of hops away) [step 1050] and records the identity of the node, its metric, and the steering angle in a steering table [step 1060]. The node 210 then determines whether it has steered its antenna through all possible directions [step 1070]. If not, the node 210 steers the antenna to the next position and repeats the processing of steps 1020–1060. If the antenna has been steered through all possible directions, the node 210 identifies the worst node from the steering table [step 1080]. The worst node may include the node with the largest metric across all of the steering angles. The node 210 then steers the antenna in the direction indicated in the steering table entry for the worst node [step 1090] and identifies the nodes in that direction for its neighbor table 720. These nodes make up the network neighborhood for node 210.

Returning to FIG. 8, once the node 210 identifies all of the nodes in its network neighborhood, it may select the "N" best nodes as network neighbors [step 820]. The simplest definition of "best" involves those nodes which, if selected as neighbors, will reduce the overall network diameter by the maximum amount. Of course, the node 210 may select all of the nodes as its network neighbors, but such an action generally increases the control traffic through the network because the control traffic generally scales with the number of network links.

Figure 11:
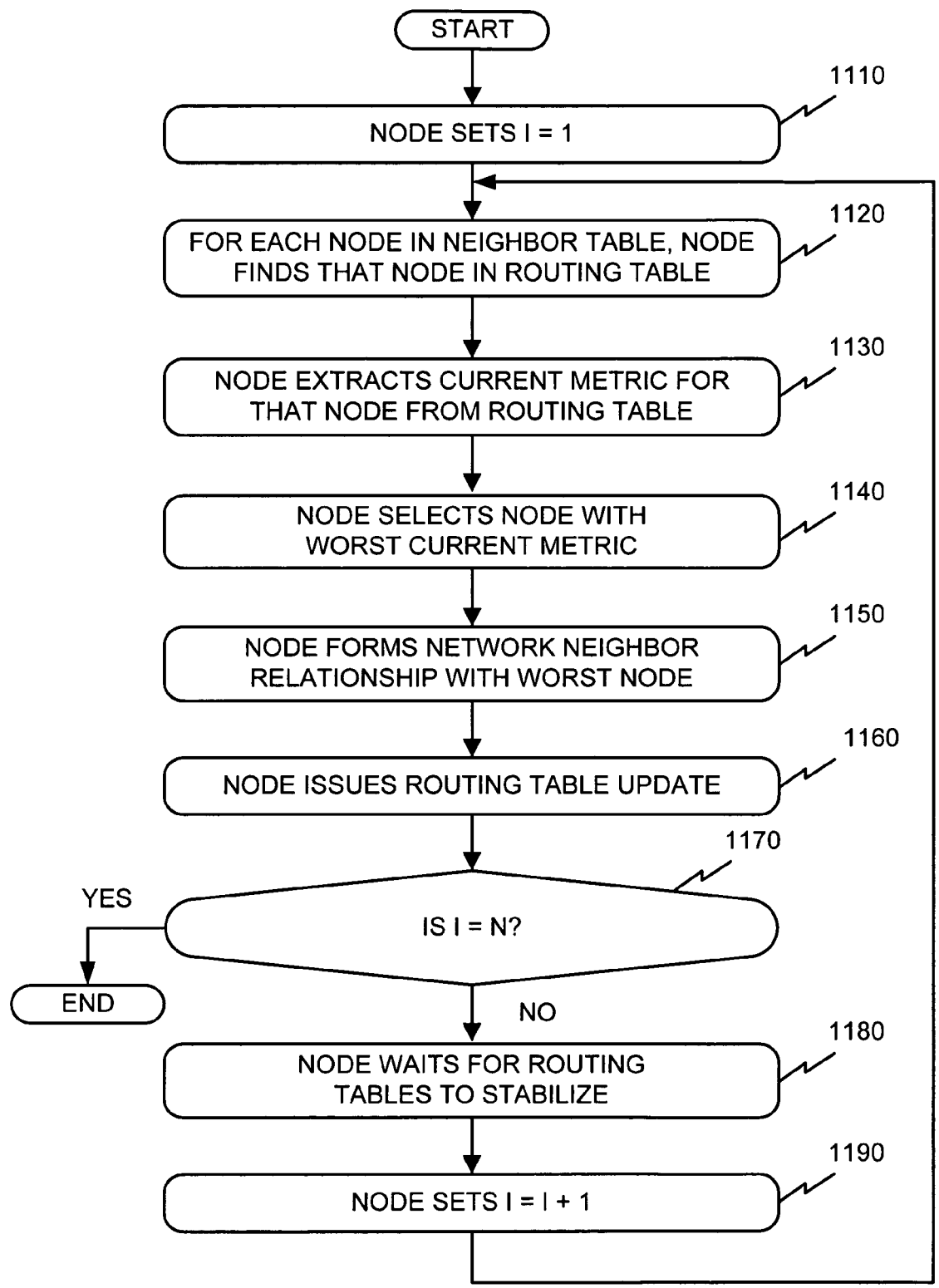
FIG. 11 is a flowchart of processing, consistent with the present invention, for selecting the best nodes in a network neighborhood.

FIG. 11 is a flowchart of processing, consistent with the present invention, for selecting the N best nodes in a network neighborhood. The node 210 begins by setting a variable, I, equal to 1 [step 1110]. The node 210 then takes each node in its neighbor table 720 and finds that node in its routing table 710 [step 1120]. The node 210 extracts the current metric for that node from the routing table 710 [step 1130]. The node 210 selects the node with the largest metric (i.e., the node that is the largest number of hops away) [step 1140] and forms a network neighbor relationship with that node [step 1150]. In essence, the node 210 selects the node that is the farthest away, since forming a direct neighbor relationship with that node will have the greatest effect on reducing the network diameter. In other implementations consistent with the present invention, the node 210 selects two or more nodes based on their metrics.

The node 210 issues a routing table update, reflecting this new link, to all of the other nodes in the network 200 [step 1160]. The node 210 may then determine whether I is equal to N (i.e., that the N best nodes have been selected) [step 1170]. If so, processing ends. If I is not equal to N, then the node 210 waits for a period of time for the entire network topology to stabilize [step 1180]. In other words, the node 210 waits for all of the other nodes in the network 200 to update their routing tables. The reason for this is because introducing the new link has affected all of the other distances (metrics) in the network. The node 210 then sets I equal to I+1 [step 1190] and repeats processing beginning at step 1120 to select the nodes that now have the largest metrics.

Returning again to FIG. 8, the node 210 changes its routing table 710 based on the nodes selected for the network neighborhood, as described above with regard to FIG. 11 [step 830]. The node 210 then routes packets through the network 200, as necessary, based on the updated routing table 710. For example, when the node 210 receives a packet for transmission across the network, it searches its routing table 710 to find the node in its network neighborhood that is closest to the destination node (i.e., the fewest number of hops away from the destination node) and transmits the packet to that node.

In the example of FIG. 5B, assume that the node 560 transmits a packet addressed to the node 570. Assume further, that the network neighborhood of the node 510 includes the node 550. When the node 510 receives the packet, it searches its routing table and finds that the node 550 is closest to the destination node (i.e., node 570) and transmits the packet to the node 550. In this manner, the number of hops to the destination node 570 may be reduced.

CONCLUSION

Systems and methods consistent with the present invention seed a network with a small number of wireless nodes that contain directional antennas in addition to, or instead of, an omni-directional antenna to form long-distance links that greatly reduce the network diameter and create a "small world" network.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while the network 200 has been described as an ad hoc wireless network, systems and methods consistent with the present invention may be applicable to other types of networks. The scope of the invention is defined by the claims and their equivalents.

What is claimed is:

1. A first node in a network having a plurality of second nodes, at least some of the second nodes including an omni-directional antenna, the first node comprising:
   a directional antenna configured to communicate with a group of the second nodes;
   a memory configured to store a routing table used for transmitting packets through the network; and
   a processor configured to identify the group of second nodes using the directional antenna, select a set of the second nodes from the group of second nodes based on routing distances to the second nodes, update the routing table based on the selected set of second nodes, and route packets through the network using the updated routing table.

2. The first node of claim 1, wherein the directional antenna includes:
   a steerable directional antenna configured to be positioned in a plurality of directions.

3. The first node of claim 2, further comprising:
   a steering mechanism configured to position the steerable directional antenna in each of the plurality of directions.

4. The first node of claim 2, wherein the processor is further configured to determine a best direction from the plurality of directions to point the steerable directional antenna.

5. The first node of claim 4, wherein the processor is configured to point the steerable directional antenna in each of the plurality of directions and identify ones of the second nodes present in each of the plurality of directions.

6. The first node of claim 5, wherein the processor is configured to receive beacons from ones of the second nodes in each of the plurality of directions to identify the second nodes present in each of the plurality of directions.

7. The first node of claim 5, wherein the processor is configured to determine a routing distance to each of the identified second nodes, select one of the identified second nodes with a largest routing distance, and point the steerable directional antenna in a direction of the selected second node.

8. The first node of claim 7, wherein the processor is configured to locate each of the identified second nodes in the routing table and extract the routing distance for each of the identified second nodes from the routing table.

9. The first node of claim 1, further comprising:
an omni-directional antenna configured to communicate with another group of the second nodes.

10. The first node of claim 1, wherein the processor is configured to transmit beacons to the second nodes and receive beacons from the second nodes.

11. The first node of claim 10, wherein the processor is configured to identify each of the nodes in the group of second nodes using the received beacons.

12. The first node of claim 1, wherein the processor is configured to determine a routing distance to each of the nodes in the group of second nodes, select one of the nodes in the group of second nodes with a largest routing distance, and include the selected second node in the set of second nodes.

13. The first node of claim 12, wherein the processor is configured to update the routing table based on the selected second node and select another one of the nodes in the group of second nodes using the updated routing table.

14. The first node of claim 13, wherein the processor is configured to determine a routing distance to each of the nodes in the group of second nodes based on the updated routing table, identify one of the nodes in the group of second nodes with a largest routing distance, and use the identified second node as the selected other second node.

15. The first node of claim 13, wherein the processor is configured to transmit an update signal to all of the second nodes, the update signal instructing the second nodes to update routing tables associated with the second nodes, wait a predetermined period of time for the second nodes to update the routing tables, and select the other second node after the predetermined period of time elapses.

16. The first node of claim 1, wherein the set of second nodes includes all of the group of second nodes.

17. A method for routing packets by a first node in a network having a plurality of second nodes, at least some of the second nodes including an omni-directional antenna, the first node including a steerable directional antenna, the method comprising:
storing a routing table for use in transmitting packets through the network;
identifying a group of the second nodes using the steerable directional antenna;
selecting a set of the second nodes from the group of second nodes based on routing distances to the second nodes;
updating the routing table based on the selected set of second nodes; and
routing packets through the network using the updated routing table.

18. The method of claim 17,
wherein the identifying includes:
determining a best direction from the plurality of directions to point the steerable directional antenna.

19. The method of claim 18, wherein the determining includes:
pointing the steerable directional antenna in each of the plurality of directions, and
identifying ones of the second nodes present in each of the plurality of directions.

20. The method of claim 19, wherein the identifying ones of the second nodes includes:
exchanging beacons with ones of the second nodes in each of the plurality of directions to identify the second nodes present in each of the plurality of directions.

21. The method of claim 19, wherein the determining further includes:
determining a routing distance to each of the identified second nodes,
selecting one of the identified second nodes with a largest routing distance, and
pointing the steerable directional antenna in a direction of the selected second node.

22. The method of claim 21, wherein the determining a routing distance includes:
locating each of the identified second nodes in the routing table, and
extracting the routing distance for each of the identified second nodes from the routing table.

23. The method of claim 17, wherein the identifying includes:
receiving beacons from the second nodes, and
identifying the group of second nodes using the received beacons.

24. The method of claim 17, wherein the selecting includes:
determining a routing distance to each of the nodes in the group of second nodes,
selecting one of the nodes in the group of second nodes with a largest routing distance, and
including the selected second node in the set of second nodes.

25. The method of claim 24, wherein the updating includes:
updating the routing table based on the selected second node, and
selecting another one of the nodes in the group of second nodes using the updated routing table.

26. The method of claim 25, wherein the selecting another one of the group of second nodes includes:
determining a routing distance to each of the nodes in the group of second nodes based on the updated routing table,
identifying one of the nodes in the group of second nodes with a largest routing distance, and
using the identified second node as the selected other second node.

27. The method of claim 25, wherein the updating the routing table includes:

transmitting an update signal to all of the second nodes, the update signal instructing the second nodes to update routing tables associated with the second nodes, and waiting a predetermined period of time for the second nodes to update the routing tables; and wherein the selecting another one of the nodes in the group of second nodes includes:

selecting the other second node after the predetermined period of time elapses.

28. The method of claim 17, wherein the selecting includes:

selecting all of the nodes in the group of second nodes as the set of second nodes.

29. A computer-readable medium that stores instructions executable by a first node to perform a method for updating a routing table for routing packets in a network having a plurality of second nodes, at least some of the second nodes including an omni-directional antenna, the first node including a directional antenna and the routing table, the method comprising:

identifying a set of the second nodes using the directional antenna;

determining routing distances to each of the nodes in the set of second nodes;

selecting a subset of the set of second nodes as network neighbors based on the determined routing distances; and updating the routing table based on the subset of second nodes selected as the network neighbors.

30. A system for selecting neighboring nodes in a network having a plurality of nodes, comprising:

a steerable antenna configured to receive beacons from nodes within a communication area; and a processor configured to determine a routing distance to each of the nodes in the communication area, select one of the nodes with a largest routing distance, and identify the selected node as a neighboring node with which the system can directly communicate.

31. A computer-readable medium that stores instructions executable by a node to perform a method for selecting neighboring nodes in a network having a plurality of nodes, comprising:

detecting, using a steerable antenna, nodes within a communication area based on beacons received from the nodes;

determining a routing distance to each of the detected nodes;

selecting one of the detected nodes with a largest routing distance; and classifying the selected node as a neighboring node.

32. A method for selecting a direction for a steerable directional antenna of a wireless node in a network including a plurality of nodes, comprising:

pointing the steerable directional antenna in each of a plurality of directions;

identifying ones of the nodes present in each of the plurality of directions;

determining a routing distance to each of the identified nodes;

selecting one of the identified nodes with a largest routing distance; and pointing the steerable directional antenna in a direction of the selected node.

33. The method of claim 32, wherein the identifying includes:

exchanging beacons with ones of the nodes in each of the plurality of directions to identify the nodes present in each of the plurality of directions.

34. The method of claim 32, wherein the determining includes:

locating each of the identified nodes in a routing table associated with the wireless node, and extracting the routing distance for each of the identified nodes from the routing table.

35. A system for selecting a direction for a steerable directional antenna of a wireless node in a network including a plurality of nodes, comprising:

a memory configured to store instructions; and a processor configured to execute the instructions in the memory to point the steerable directional antenna in each of a plurality of directions, identify ones of the nodes present in each of the plurality of directions, determine a routing distance to each of the identified nodes, select one of the identified nodes with a largest routing distance, and point the steerable directional antenna in a direction of the selected node.

36. A computer-readable medium that stores instructions executable by at least one processor to perform a method for selecting a direction for a steerable directional antenna of a wireless node in a network including a plurality of nodes, comprising:

aiming the steerable directional antenna in each of a plurality of directions;

identifying ones of the nodes present in each of the plurality of directions;

determining a routing distance to each of the identified nodes;

selecting one of the identified nodes with a largest routing distance; and pointing the steerable directional antenna in a direction of the selected node.

37. A small world network, comprising:

a plurality of first nodes, each of the first nodes including an omni-directional antenna; and at least one second node, including:

a steerable directional antenna configured to be positioned in a plurality of directions and communicate with a group of the first nodes, a memory configured to store a routing table used for transmitting packets through the network, and a processor configured to identify the group of first nodes, determine a routing distance to each node in the group of first nodes, select at least one of the first nodes based on the routing distance, update the routing table based on the selected at least one first node, and route packets through the network using the updated routing table.

38. The network of claim 37, wherein the processor is further configured to determine a best direction from the plurality of directions to point the steerable directional antenna.

39. The network of claim 37, wherein the at least one second node includes a plurality of second nodes, and a number of the second nodes is small in relation to a number of the first nodes.

40. The network of claim 37, further comprising:

at least one third node that includes both a directional antenna and an omni-directional antenna, where the at least one third node is capable of functioning as a first node or a second node.

* * * * *